United States Patent
Schaefer (10) Patent No.: US 7,426,661 B2
(45) Date of Patent: Sep. 16, 2008

(54) METHOD AND SYSTEM FOR MINIMIZING LOSS IN A COMPUTER APPLICATION

(75) Inventor: Stuart Schaefer, Marblehead, MA (US)

(73) Assignee: Softricity, Inc., Boston, MA (US)

( * ) Notice: Subject to any disclaimer, the term of this patent is extended or adjusted under 35 U.S.C. 154(b) by 507 days.

(21) Appl. No.: 11/183,560

(22) Filed: Jul. 18, 2005

(65) Prior Publication Data

US 2006/0020858 A1 Jan. 26, 2006

Related U.S. Application Data

(60) Provisional application No. 60/589,262, filed on Jul. 20, 2004.

(51) Int. Cl.
G06F 11/00 (2006.01)
(52) U.S. Cl. ........................................ 714/38
(58) Field of Classification Search ............... None
See application file for complete search history.

(56) References Cited

U.S. PATENT DOCUMENTS

| 5,274,813 | A | | 12/1993 | Itoh et al. |
| 6,240,531 | B1 | * | 5/2001 | Spilo et al. ................ 714/38 |
| 6,634,001 | B2 | * | 10/2003 | Anderson et al. ........... 714/38 |
| 6,708,291 | B1 | | 3/2004 | Kidder |
| 7,089,455 | B2 | * | 8/2006 | Ruhlen et al. ............... 714/38 |
| 7,293,201 | B2 | * | 11/2007 | Ansari ....................... 714/38 |
| 2002/0133738 | A1 | | 9/2002 | Zeigler et al. |
| 2003/0046612 | A1 | * | 3/2003 | Grey ......................... 714/38 |
| 2004/0205723 | A1 | * | 10/2004 | Juan et al. ................. 717/124 |

FOREIGN PATENT DOCUMENTS

EP 0433979 A2 6/1991

* cited by examiner

Primary Examiner—Christopher S McCarthy
(74) Attorney, Agent, or Firm—Woodcock Washburn LLP (57) ABSTRACT

During the execution of a software application, a user will often create significant data representing the work they are trying to accomplish. Additionally, the act of using the application will create states within that program reflecting the operations performed during use. In many scenarios, this data can be lost through application, system, or network failure. The present invention provides a means for resilience through (a) redirection of program execution in response to failure onto known code paths representing save and/or exit from the program, (b) suspension of the program and restoration after the fault has been repaired, and (c) snapshot of the application state for restoration after the application failure.

31 Claims, 5 Drawing Sheets

METHOD AND SYSTEM FOR MINIMIZING LOSS IN A COMPUTER APPLICATION

CROSS-REFERENCE TO RELATED APPLICATIONS

This application claims priority to U.S. Provisional Patent Application No. 60/589,262, filed on Jul. 20, 2004, which is incorporated herein by reference.

TECHNICAL FIELD

This invention relates to general fault tolerance of computer software applications and methods and systems for making individual applications able to operate in faulty scenarios for which they were not programmed or intended.

BACKGROUND

Computer systems and software applications have become increasingly complex and distributed. Both of these factors contribute to the common problem of data loss. As an end user operates a software application, they will commonly save the results of the operations in one or more data files, to a database, or elsewhere. The action of committing these operations creates a state change in the system that can effectively act as a checkpoint. Application programmers spend significant amounts of time ensuring that their software programs will perform as intended at these checkpoints, either committing or rejecting the changes.

It is also common, however, for state changes to accumulate in between these checkpoints. In most software applications there can be an appreciable amount of time elapsed or operations taken between commits. If the application fails during this interval, the actions taken by the user may be lost, back to the last checkpoint. The user must then re-open the application, study its viewable state to understand what was lost, and recreate those actions taken.

Application failures can occur for several reasons, including network failures, hardware failures, server or systemic failures, or other operating glitches. In new software modes, where users disconnect laptops or other mobile devices from a network, or where applications are streamed or delivered in pieces to client computers, the possibilities for failures increase. Many applications are not designed to be operated while disconnected from the network, or to be operated without the entirety of the program and its assets present at runtime.

It is desirable to provide a means to accommodate or overcome these and other forms of failures, eliminating lost work both at and between checkpoints without requiring applications to be rewritten or to take into consideration all forms of failure, as this would be cost and time prohibitive. A set of simple, general purpose methods are proposed to provide desired resiliency without modification to any software application, nor access to the software application code or design.

Methods have been proposed to accomplish solutions to this problem for specific applications or purposes at design time, such as the methods described in U.S. Pat. No. 6,014,681 to Walker, et al., entitled *Method for Saving a Document Using a Background Save Thread.* U.S. Pat. No. 5,748,882 to Huang entitled *Apparatus and Method for Fault-Tolerant Computing* discloses libraries of fault tolerant routines that have been created for application developers to use. The method of the present invention overcomes the limitation of requiring an application to be designed and built to be fault tolerant by using such libraries. The invention provides an extensible solution framework for handling the many requirements of past, present and future software systems.

SUMMARY

The present invention provides a method and system for preventing or minimizing the loss of data when a fault or potential fault occurs in a computer application. The method and system of the present invention can minimize or prevent the loss of data without requiring any modification or access to the code for the application that is in use.

In the present invention, a helper application is provided to monitor a primary application running on a target computer to detect the presence of a fault or a potential fault in the primary application. When a fault is detected, the helper application selects a method for handling the fault, and then performs the selected method.

The helper application monitors the primary application by intercepting calls to the primary application and inspecting the results of the calls. The helper application monitors internal operations of the application (such as logic failures) and/or external operations (such as loss of network connectivity, failure of external services required by the application, failure of attached devices, and failure of peer or server networks).

If a fault is identified, the helper application determines which fault handler is most appropriate. In the preferred embodiment of the present invention there are provisions for fault handlers including a redirection handler, a suspending handler and a snapshot handler. The system is extensible to provide the ability to utilize any number of different handlers for different purposes. Examples of other handlers might be an automatic restart handler or a rewinding handler.

If the redirection handler is selected, the redirection handler invokes a save logic of primary application. The save logic can be invoked by (a) directly calling the primary application save entry point, (b) resetting the program counter to the save entry point, or (c) inserting jump instructions to force call of the save.

If the suspension handler is selected, the suspension handler suspends the application, and waits for notification that resumption can occur. Once it gets this notification, the suspension handler either (a) resumes the primary application or (b) resets the program counter of the primary application or (c) reinvokes the originally faulty API. The suspensions handler prevents stray resumption of the primary application while the primary application is suspended by making the primary application controllable only through pre-determined means. The primary application may be suspended for the duration of the fault, or it can be suspended by a user interface in anticipation of a faulty state.

If the snapshot handler is selected, the snapshot handler suspends the processes and threads of the primary application in response to the presence of a fault or potential fault in the primary application. The snapshot handler then takes a memory snapshot of the primary application, stores the memory to non-volatile storage, terminates the primary application, and on invocation, restores the primary application. The snapshot handler prevents the primary application from being invoked again until the fault is cleared or explicitly confirmed by the user.

In the embodiments described above, the helper application classifies which set of faults it will handle as well as what handlers it may invoke. The system may get this knowledge offline or online through a variety of techniques. In the most basic system, the handler will simply register to detect all faults.

According to another aspect of the invention, an additional step is taken to perform static analysis on the primary application code to determine both its composition and its potential for faults, as well as its common program entry points such as "save" or "exit". After the analysis is complete, the analyzer can present a list of those faults which are recoverable and those which are not recoverable and recommendations on handling. For both sets of faults, actions can then be proscribed for configuring the fault handlers. For those faults which are not recoverable, the redirection handler is commonly used. If no "save" code exists or is identifiable, the system can be setup to simply exit gracefully, though data would not necessarily be preserved.

To analyze program entry points, the helper application can use platform knowledge to discover sources. In an alternate embodiment, faults and entry points can be identified using dynamic analysis. The program can therefore be traced during its execution to identify these signatures.

DETAILED DESCRIPTION OF THE PREFERRED EMBODIMENTS

Figure 1:
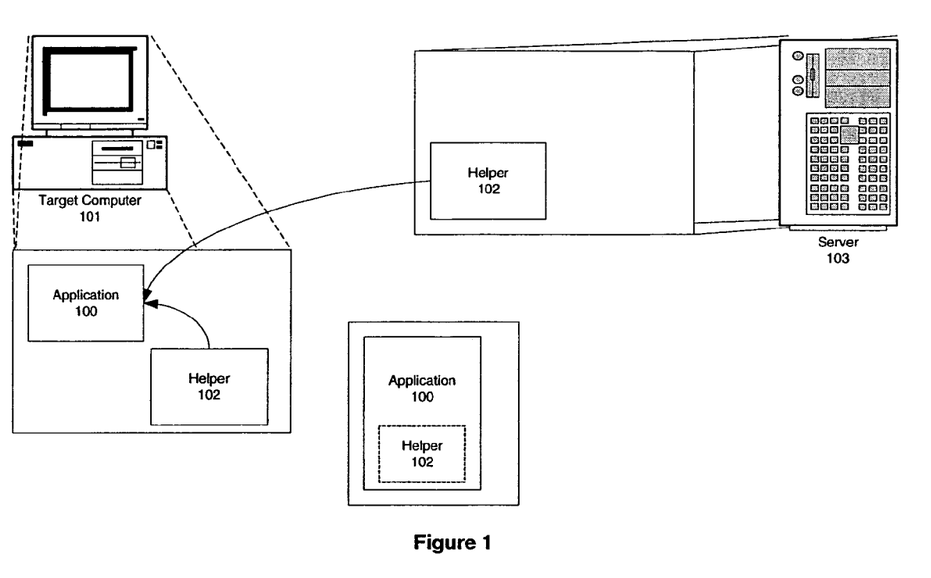
FIG. 1 shows a schematic diagram of one embodiment of the system and method of the present invention.

A software application 100 executes on a target computer 101 as shown in FIG. 1. A helper application 102 executes on the same computer concurrently, though it may also exist in whole or in part as a service program on an alternate computer 103. This helper application 102 can either reside as a standalone process, injected into the primary application's memory space, or as part of the computer's operating system as a device driver or otherwise. It is not necessary to recompile or otherwise modify the primary application 100. The primary application 100 may exist as a standalone program or in communication with one or more peer or server computers in a network.

Figure 2:
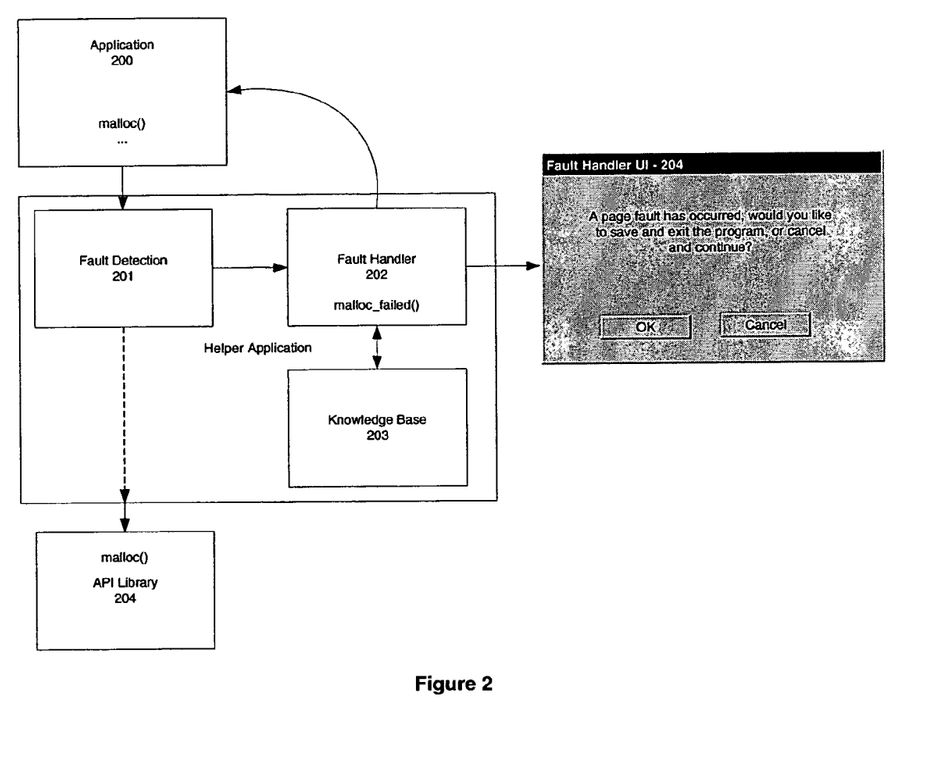
FIG. 2 shows a schematic diagram of the fault detection processes utilized in the system and method of the present invention shown in FIG. 1.

Referring to FIG. 2, the helper application 102 includes a fault detector 201, a fault hander 203, and a knowledge base 203. As the primary application 100 executes, the fault detector 201 monitors the primary application 100 to attempt to detect the presence of a fault. Fault detection is done both in response to internal operations of the primary application 100, and in response to other external factors, such as loss of network connectivity, failure of external services required by the application, failure of attached devices such as printers and modems, failure of peer or server computers in its network. To accommodate internal errors, the fault detector intercepts various messages and actions taken by the primary application 100. In one example method (shown in FIG. 2), the helper application 102 monitors the primary application's call to memory allocation routines, such as the use of malloc( ) and failed( ) in the standard C runtime library. If the malloc( ) routine is unable to allocate the memory that was requisitioned, a memory fault has occurred.

In this example, the call of the primary application to the malloc( ) routine is intercepted by the fault detector 201. Note that in an alternative embodiment of the present invention, the fault detector could operate in a manner as to not actually intercept the routine call, but monitor its output for faults such as exceptions, bad return codes or other incorrect behavior. The intercepted call is forwarded to the malloc( ) routine. On return, the fault detector will inspect the results of the call. At this point, the fault detector will branch and either return control back to the primary application 100, or invoke a fault handler 202. The fault handler 202 may contain statically coded decisions and/or a system such as a configurable Knowledge Base (203) (as shown in FIG. 2) to invoke a fault handling routine based on a larger set of behaviors and heuristics.

In one embodiment, the Knowledge Base 203 contains a set of rules and behaviors which are configurable to respond to a variety of failure scenarios. In being a rule base, it is also extensible over time. Simply by adding rules, one can extend the ability of the system to handle new faults, employ new behaviors, or make different decisions based on the available information. The fault handler will query the Knowledge Base using the information available about the current fault. In the current example, the fault handler would signal the Knowledge Base that a malloc_failed event occurred within the current program. The Knowledge Base would then invoke its rule base to make a decision based on any rules it has concerning the application and machines current state, the type of fault that occurred, any severity or extended error information available with the fault, or any application specific fault handling rules. The Knowledge Base can be implemented in a variety of ways including decision trees, cased-based reasoners, or combinations of techniques. The result of the Knowledge Base processing is selection of an action, or no action, to take in response to the fault. This return instruction will indicate to the fault handler how to proceed with the current fault.

The fault detector 201 also responds to external events on the target computer 101, or in the network of which it is a part. For example, the target computer 101 may indicate that its power is low, as when a mobile device is running on batteries. The fault detection system 201 can observe this event and invoke the fault handler to select an appropriate recovery action via the Knowledge Base. In other implementations, the fault detector 201 can be configured to respond to loss of network connectivity, failure of external services required by the application, failure of attached devices such as printers and modems, failure of peer or server computers in its network, and other important events. The fault detector can be seen then to contain two different modules, one for observing application specific faults and a second for observing general system failures or environmental problems.

The fault detector 201 can be used in connection with a mobile device, capable of disconnecting from a network. In this type of device, network interruptions can be frequent and the code of the primary application 100 may not be designed for mobility. In addition, in mobile devices, the code of the primary application 100 may be streamed, a delivery mode in which the primary application 100 is broken down into code segments that are needed to operate certain functions of the primary application 100. These code segments are delivered to the mobile device just-in-time, so that the primary application 100 can be deployed quickly, with a minimal footprint. In this mode, it is common for the mobile device operator to request a function of the primary application 100 during offline use that may not be available. At the time that this function is requested, the code segment will not be present and will not be accessible from the network.

In one embodiment of this invention, if the mobile device operating system issues a page fault indicating a failure to access a system code page of the primary application, the fault detector 201 traps this fault and invokes the fault handler 202. In an alternate embodiment, the fault detector 201 is embedded within the mobile device operating system, as part of the system for streaming the application. In this system, the fault can be detected before the page fault occurs, as the network request for the data packet fails, and the faulty behavior detected directly.

Since the mobile device may disconnect from the network, it may lose contact with or be unable to contact network resources. If the primary application 100 attempts and fails to connect to the network, another class of faults can occur. With this class of faults, the fault detector 201 can intercept the request to the network and execute an appropriate fault behavior on failure.

As noted above, after a fault is detected, the fault handler 202 determines which fault handler is most appropriate. In some cases, the fault handler will invoke the helper application 102 to allow the user to decide on a course of action, or to invoke actions which may be configured by the helper application. The helper application can notify the user of the presence of a fault, log the fault internally, or forward the fault notification to various monitoring systems such as SNMP, WMI or the Windows Event Log. The helper application may also ask the user if they choose to handle the fault or allow the failure to occur, and further ask the user to choose an appropriate action if many are possible.

Primary fault handlers include a redirection handler, a suspension handler, and a snapshot handler. Each of these fault handlers will now be described in detail below.

Redirection Handler

Figure 3:
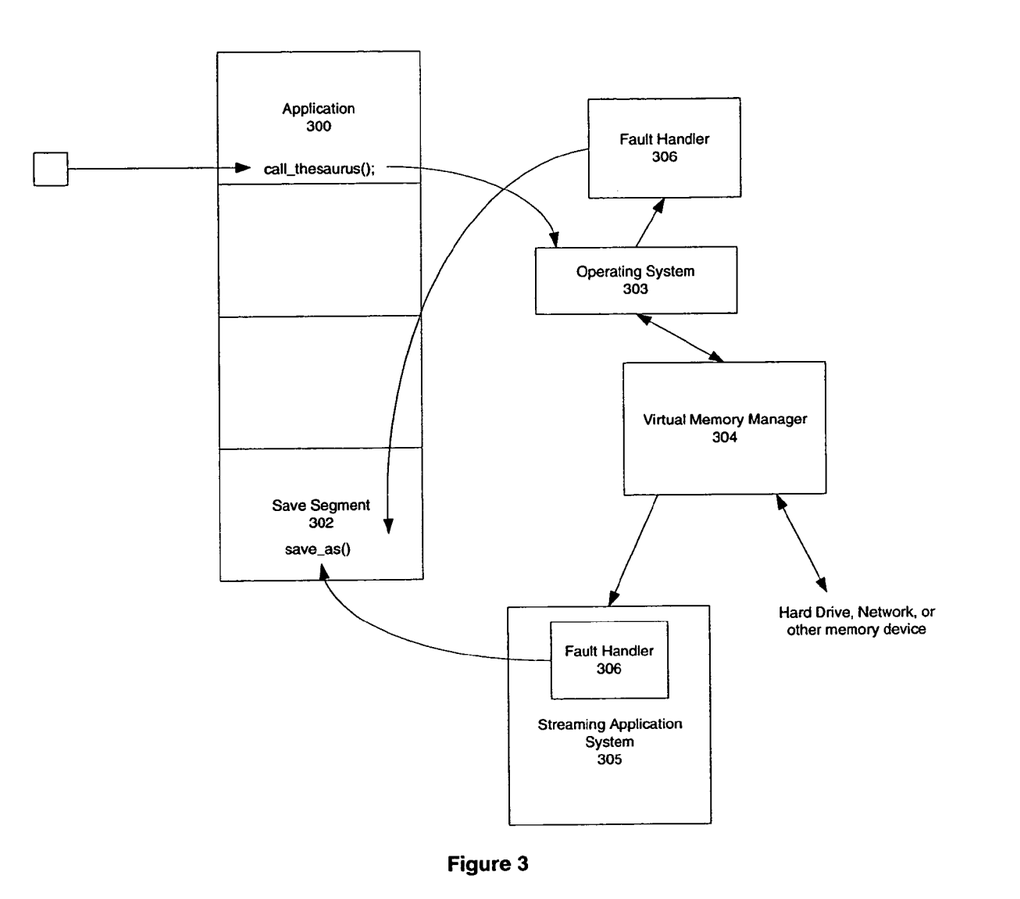
FIG. 3 shows schematic diagram of the operation of the program counters in the system and method of the present invention shown in FIG. 1.

When the redirection handler is invoked, the redirection handler redirects the primary application to "save and exit" logic of the primary application and then exits. An embodiment of the invention using the redirection handler is shown in FIG. 3. At the point the fault has occurred, the primary application 100 is running inside of the intercept routine of the fault detector 201. The operating system's program counter will currently point to this intercept routine and would normally continue to execute the next instruction after the call to the faulty API. The redirection handler will alternately invoke the application's save logic 302 and then exit the primary application 100. This invoking of the save logic is implemental by (a) directly calling the primary application 100 save entry point, (b) resetting the program counter to the save entry point, or (c) inserting a jump instruction in the calling program to force call of the save and exit logic.

In the example shown in FIG. 3, the primary application attempts to call the API call_thesaurus( ). The code segment for this routine has not been paged in by the operating system 303. Thus, the operating systems 303 intercepts the call and queries its virtual memory manager 304 to retrieve the code page. When this fails, the operating system 303 will raise a page fault, normally terminating the primary application 100. The page fault is then intercepted by the redirection handler 306. Alternatively, the redirection handler 306 can receive the "failure to retrieve the code" page directly from the routine.

In some cases, the primary application may have several variants to saving and exiting. There may be "save as", "disconnect", or "exit" which encapsulates the saving functionality. Fault handler 306 ensures that the user is given a safe means to save the work that has been done and exit from the application, avoiding a fault and/or a crash of the application. The user may restart the application after exit, but he/she will know that the fault has occurred and may occur again.

In one embodiment of the fault handler, the primary application invokes its "save" logic, but its data file will be redirected to a local data source, or proxy store, so that the primary application can complete its save operation in the case where the data file is either corrupt and causing write failures, or is a network file and the network is unavailable. Normally the program would generate a further error as it could not communicate with the network file server or save its file effectively. On reconnection, the data file or proxy store can be synchronized with or replace the source data file.

Suspension Handler

When the suspension handler is invoked, the suspension handler suspends all processes, children and threads that comprise the primary application 100. Once the primary application 100 has been suspended, the suspension handler waits for notification that resumption can occur (e.g., an event such as the network being re-established, or the user selecting a control to indicate its desire to continue). On request to continue, the suspension handler can (a) resume the primary application directly, (b) reset the program counter, or (c) reinvoke the originally faulty API.

During suspension, the primary application 100 will remain in existence in its entire form and will still be visible as an application on the target computer 101. In one embodiment, the suspension handler will prevent stray resumption of the primary application through simple system tools such as the Windows Task Manager. It will suspend the primary application to be controllable only through explicit means or through the internal helper application 102.

The suspension handler is often used for applications in which there is no explicit "save" functionality. The application saves its state as a series of side effects, or through communication with an external server, database or other system. In one example, the application is a hypertext application, and connection to the HTTP server is lost. In this example, the user side state of the hypertext application can be stored, or the entire hypertext browser application can be stored. When the server is back online, the application can continue, using its saved state.

Snapshot Handler

If the fault indicates of a long-term problem, and suspension will not survive the duration of the problem, as the target computer may be power cycled, or suffer from additional faults, and the snapshot handler is invoked. In this situation, it is desired to backup the running state of the primary application, for later restoration.

When the snapshot handler is invoked, the snapshot handler suspends the processes and threads of the primary application, takes a memory snapshot of the primary application, including kernel data structures not part of the application, but used for restoring it as a process. This memory snapshot can then be written to disk, for later recovery. In an alternate method, the snapshot handler can periodically, proactively snapshot the primary application to provide a finer grain means of recovery. In order to avoid overwhelming overhead, the memory snapshot can be quickly taken, and in the background store the memory to disk or other non-volatile storage. Once the snapshot is complete, the snapshot handler can then terminate the primary application if the snapshot is being taken because of a long-term problem.

Once the primary application has been terminated, the helper application 102 can then act to prevent the application from being invoked again until the fault has cleared, or the user has explicitly confirmed that the user wants the application invoked again. On invocation, the helper application can then restore the primary application 100, or simply allow another instance of the primary application to be created instead. Alternately, the helper application can transfer the snapshot image to a peer or server computer in the network for resumption there.

On restoration, the fault handler will map back the memory of the process and reset internal operating system kernel data structures to ensure that the program is able to continue exactly as it had left off. As an example, if the application 100 has several files open at the time of fault, the snapshot handler will need to reopen the files and reassign the known file handles so that the primary application does not generate errors trying to use its old file handles. Also, the file handles must point to the appropriate offset in the file if they are set for stream access.

Figure 5:
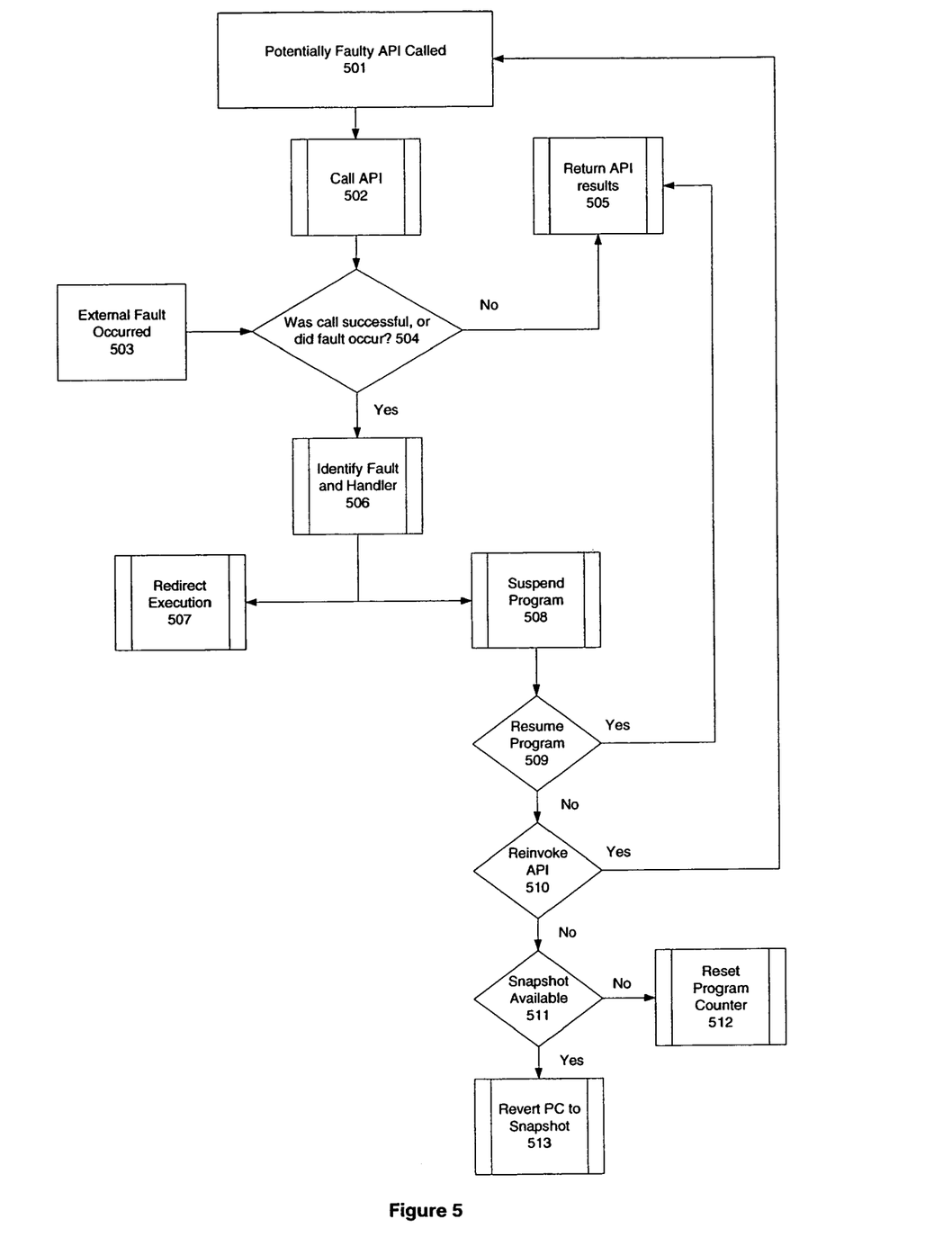
FIG. 5 shows a flow chart of the steps performed by the method of the present invention shown in FIG. 1 to detect and handle faults.

FIG. 5 shows a flow chart of one embodiment of the helper application of the present invention. A potentially faulty API is called in steps 501, 502 and the helper application 102 asks whether the call was successful or whether a fault has occurred in step 504. If a fault has not occurred, the application returns the API results in step 505. If a fault has occurred, the helper application 102 identifies the fault handler, choosing between the redirection handler and the suspension handler. If the suspension handler is selected in step 508, the helper program asks whether the primary application may be resumed. If the program is resumed, it returns the API results in step 505. If the primary application is not resumed, the helper application asks whether to reinvoke the API in step 510. If the API is not to be reinvoked, the helper application asks whether a snapshot is available. If a snapshot is available, in step 511 the helper application reverts the PC to the snapshot in step 513. If the snapshot is not available, it resets the program counter in step 512.

In yet another embodiment of this invention, the helper application 102 will also restore external connections such as to a database, a TCP/IP socket, or other IPC mechanism. In order to do so, the helper application 102 may ask the user for assistance such as with database login or authentication with an HTTP server. As described above, the system may need to reset some primary application internals or redirect handles to entities that have changed, like a socket descriptor. In an alternate embodiment, a user interface can be provided to allow the user to explicitly invoke this behavior, regardless of the (non)existence of faults.

The helper application classifies which set of faults that it will handle in addition to what handlers that it may invoke. The helper application may get this knowledge offline or online through a variety of techniques. In one example, the fault handler will register to detect all faults.

In another embodiment of the invention, an additional step is taken to perform static analysis on the primary application code to determine its composition and potential for faults, as well as its common program entry points such as "save" or "exit". In examination for potential faults, the analysis routines look for the use of a set of common API's such as access to files, or to databases through ODBC, or as described above use of memory routines such as malloc( ) and free( ) or IPC routines such as socket( ) or Windows GetNamedPipe( ).

Figure 4:
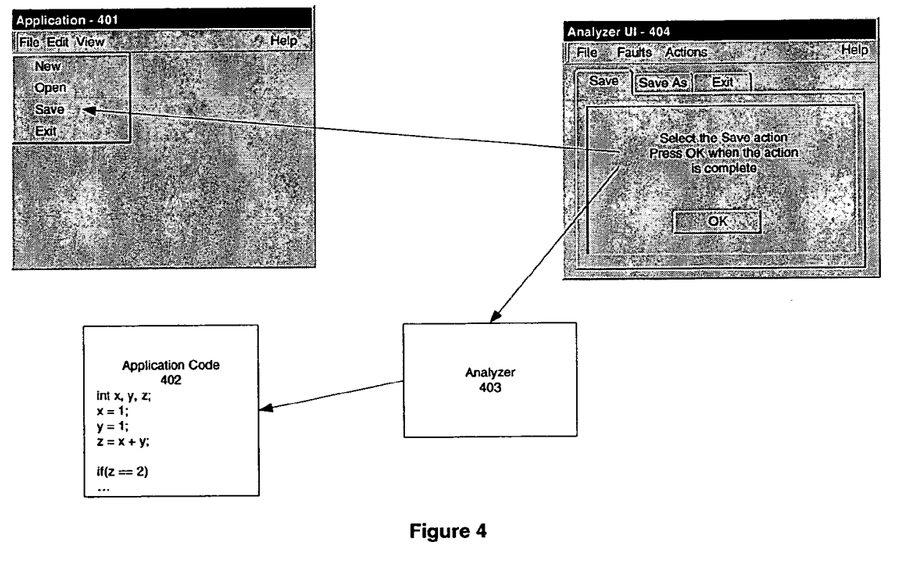
FIG. 4 shows a schematic diagram of a program analyzer used by the system and method of the present invention shown in FIG. 1.

After the analysis is complete, the analyzer 403 can present a list of those faults which are known to be recoverable through the systems available fault handlers and those which are not recoverable and recommendations for handling the faults (See FIG. 4). For both sets of faults, actions can then be proscribed for configuring the fault handlers. For those faults which are not recoverable, the of redirection handler is commonly used. If no "save" code exists or is identifiable, the system can be setup to simply exit gracefully.

To analyze program entry points, the system can use platform knowledge to discover sources. For example, on the Microsoft Windows platform, a message handler that can respond to the WM_EXIT message may correspond to the "exit" routine of the program. Thus, a search for WM_EXIT will indicate this function point. Alternately, a resource file may describe the File:Exit menu command and the Windows message that it will generate on invocation. If these indicators do not exist, the analyzer can go further to look for use of API's such as the Windows ExitProcess( ) or exit( ) functions. In searching for the "save" routine, the analyzer can look for any use of files or external data sources.

In an alternate embodiment, faults and entry points can be identified using dynamic analysis. The program can be traced during its execution to identify these signatures. In one embodiment, dynamic analysis is done with an entry point identifier UI 404 that records entry points in a manner similar to macro recording. As the user indicates that they will be identifying the "save" function, the identifier records all UI and program activity. From these signatures, the entry point and associated code can be identified. For streamed applications in which the application is used offline, the code identified with the "save" and "exit" functions is tagged specially to indicate that it must always be streamed and present in the offline mode to ensure that this behavior can be invoked.

The present invention also provides a means to allow disruption in the use of or faults in an application to be accommodated without the loss of work. Normally, failure during the use of an application would cause some amount of work done in that program, whether complete or not, to be abandoned. The system and method of the present invention provide for more than simple recovery of the program, but instead enable a means to ensure no data loss is suffered. Furthermore, it is done without requiring any modification, recompilation, or redesign of software, and allows new software to be built with this paradigm in mind.

While the invention has been described in connection with certain preferred embodiments, it will be understood that it is not intended to limit the invention to those particular embodiments. On the contrary, it is intended to cover alternatives, modifications and equivalents as well. Some specific components, figures and types of materials are mentioned, but it is to be understood that such component values, dimensions and types of materials are, however, given as examples only and are not intended to limit the scope of this invention in any manner.

What is claimed is:

1. A method for minimizing loss of data while executing a computer application comprising the steps of:
   intercepting a call to the computer application;
   inspecting the results of the intercepted call to detect the presence of a fault or potential fault;
   if the presence of a fault or potential fault is detected:
      selecting a method for handling the fault or potential fault; and
      performing the selected method for handling the fault or potential fault;
      wherein the steps of intercepting, inspecting, selecting and performing are carried out without access to or modification of the code for the computer application;
   if the presence of a fault or the potential fault is not detected, returning control back to the computer application.

2. The method of claim 1 wherein the method for handling the fault or potential fault is selected from the following methods:
   redirecting execution of the code of the computer application;
   suspending the computer application; and
   taking a memory snapshot of the computer application.

3. The method of claim 1 wherein the step of performing the selected method for handling the fault or potential fault comprises invoking save logic of the computer application in order to save data.

4. The method of claim 1 wherein the step of performing the selected method for handling the fault or potential fault comprises
   suspending the computer application;
   monitoring the computer application for an indication that resumption can occur; and
   selecting one of resuming the computer application or resetting to a program counter of the computer application.

5. The method of claim 1 wherein the step of performing the selected method for handling the fault or potential fault further comprises:
   suspending the computer application;
   taking a memory snapshot of the computer application; and
   storing the memory snapshot in non-volatile storage means.

6. The method of claim 1 further comprising monitoring internal operations of the computer application.

7. The method of claim 1 further comprising monitoring external events.

8. The method of claim 1 further comprising communicating with a user of the computer application regarding the fault or potential fault.

9. The method of claim 1 further comprising analyzing code of the computer application to identify common entry points.

10. The method of claim 9 wherein the step of analyzing the code to identify common entry points comprises tracing the application during its execution.

11. A method for minimizing loss of data while executing a computer application comprising:
    intercepting a call to the computer application;
    inspecting the results of the intercepted call to detect the presence of a fault or potential fault;
    if the presence of a fault or potential fault is detected:
       invoking save logic of the computer application in order to save data associated with the computer application;
       selecting a method for handling the fault or potential fault; and
       performing the selected method for handling the fault or potential fault wherein the steps of intercepting, inspecting, selecting and performing are carried out without access to or modification of the code for the computer application; and
    if the presence of a fault or the potential fault is not detected, returning control back to the computer application.

12. The method of claim 11 wherein the step of invoking save logic of the computer application comprises directly calling the computer application save entry point.

13. The method of claim 11 wherein the step of invoking save logic of the computer application comprises resetting a program counter of the computer application to a save entry point.

14. The method of claim 11 wherein the step of invoking save logic of the computer application comprises inserting jump instructions in the live code stream to force call of a save.

15. The method of claim 11 wherein the step of invoking save logic of the computer application comprises redirecting the computer application to a local data source or proxy store.

16. The method of claim 11 further comprising recording the fault or potential fault internally in a system executing the computer application.

17. The method of claim 11 further comprising forwarding a fault notification to an external monitoring system.

18. The method of claim 11 further comprising communicating with a user of the computer application regarding the fault or potential fault.

19. The method of claim 18 wherein the step of communicating with a user of the computer application regarding the fault or potential fault comprises asking the user if it wants the fault or potential fault to be handled or whether the fault or potential fault should be allowed to occur.

20. A method for minimizing loss of data while using a computer application comprising:
    monitoring a computer application to detect the presence of a fault or potential fault;
    in response to detection of the presence of a fault or potential fault, communicating with a user via a user interface to determine whether the computer application is to be suspended in anticipation of a faulty state;
    suspending the computer application based on the determination of the user;
    monitoring the suspended computer application for an indication that resumption can occur; and
    selecting to either resume the suspended computer application or reset a program counter of the suspended computer application.

21. The method of claim 20 further comprising preventing unwanted resumption of the computer application while the computer application is suspended.

22. The method of claim 21 wherein the step of preventing unwanted resumption of the computer application comprises making the computer application controllable only through predetermined means.

23. The method of claim 20 further comprising the step of saving a state of the computer application as a series of side effects.

24. The method of claim 20 further comprising the step of saving a state of the computer application though communication with an external system.

25. The method of claim 20 wherein the computer application is suspended for the duration of a detected fault.

26. A method for minimizing loss of data while using a computer application comprising:
    monitoring a computer application to detect the presence of a fault or potential fault;
    in response to the to detection of the presence of a fault or potential fault in the computer application, communicating with a user via a user interface to determine if the computer application is to be suspended in anticipation of a faulty state;
    suspending the computer application based on the determination of the user;
    taking a memory snapshot of the application;
    storing the memory snapshot to an auxiliary memory device;

monitoring the suspended computer application for an indication that resumption can occur; and selecting to either resume the suspended computer application or reset a program counter of the suspended computer application.

27. The method of claim 26 further comprising terminating the computer application after the memory snapshot is stored and on invocation, either restoring the computer application or allowing another instance of the computer application to be created.

28. The method of claim 27 wherein the stored memory snapshot is recoverable after termination of the computer application.

29. The method of claim 27 wherein the step of restoring the computer application comprises mapping memory of the computer application and resetting internal operating system kernel data structures.

30. The method of claim 26 further comprising preventing the computer application from being invoked after suspension of the computer application until a detected fault or potential fault is cleared or explicitly confirmed by a user.

31. The method of claim 26 further comprising the steps of restoring an external connection to a computer on which the computer application is used in response to detection of a fault that the external connection is disconnected.

* * * * *